(12) United States Patent
Cui et al.

(10) Patent No.: US 11,726,475 B2
(45) Date of Patent: Aug. 15, 2023

(54) AUTONOMOUS AERIAL VEHICLE AIRSPACE CLAIMING AND ANNOUNCING

(71) Applicants: AT&T Intellectual Property I, L.P., Atlanta, GA (US); AT&T Mobility II LLC, Atlanta, GA (US)

(72) Inventors: Zhi Cui, Sugar Hill, GA (US); Sangar Dowlatkhah, Cedar Hill, TX (US); Sameena Khan, Peachtree Corners, GA (US); Troy Paige, Buford, GA (US); Ari Craine, Marietta, GA (US); Robert Koch, Peachtree Corners, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 249 days.

(21) Appl. No.: 17/107,776

(22) Filed: Nov. 30, 2020

(65) Prior Publication Data

US 2022/0171387 A1 Jun. 2, 2022

(51) Int. Cl.
*G05D 1/00* (2006.01)
*B64D 47/08* (2006.01)
(Continued)

(52) U.S. Cl.
CPC ........... *G05D 1/0088* (2013.01); *B64C 39/02* (2013.01); *B64D 1/08* (2013.01); *B64D 1/22* (2013.01);
(Continued)

(58) Field of Classification Search
CPC .... G05D 1/0088; G05D 1/0094; G05D 1/101; G05D 1/104; B64C 39/02;
(Continued)

(56) References Cited

U.S. PATENT DOCUMENTS 5,295,551 A 3/1994 Sukonick
5,636,123 A 6/1997 Rich et al.
(Continued)

FOREIGN PATENT DOCUMENTS

CN 105278759 B 1/2016
CN 107945103 A 4/2018
(Continued)

OTHER PUBLICATIONS

Mueller, et al., "Jogging with a Quadcopter", CHI 2015, Apr. 18, 2015, exertiongameslab.org, downloaded from http://exertiongameslab.org/wp-content/uploads/2011/07/quadcopter_chi2015.pdf, 10 pages.
(Continued)

*Primary Examiner* — Vivek D Koppikar
*Assistant Examiner* — Dominick Mulder

(57) ABSTRACT

A processing system of an autonomous aerial vehicle including at least one processor may obtain mapping data describing at least a portion of a facility, navigate, via the mapping data, to a space within the facility to perform an assigned task, and collect spatial sensor data within the space. The processing system may then detect, from the spatial sensor data, at least one object within the space, define a reserved zone within the space to perform the assigned task, based upon the at least one object that is detected, and present at least one of an audible announcement or a visual announcement of the reserved zone.

20 Claims, 4 Drawing Sheets

(51) Int. Cl.

| | | |
|---|---|---|
| *B64D 47/06* | (2006.01) | |
| *B64D 1/08* | (2006.01) | |
| *B64D 1/22* | (2006.01) | |
| *G06Q 10/02* | (2012.01) | |
| *G05D 1/10* | (2006.01) | |
| *G01C 21/20* | (2006.01) | |
| *G01C 21/00* | (2006.01) | |
| *B64C 39/02* | (2023.01) | |

(52) U.S. Cl.
CPC .............. *B64D 47/06* (2013.01); *B64D 47/08* (2013.01); *G01C 21/206* (2013.01); *G01C 21/3859* (2020.08); *G05D 1/0094* (2013.01); *G05D 1/101* (2013.01); *G06Q 10/02* (2013.01)

(58) Field of Classification Search
CPC ........ B64C 2201/024; B64C 2201/027; B64C 2201/128; B64C 2201/141; B64C 39/024; B64D 1/08; B64D 1/22; B64D 47/06; B64D 47/08; G01C 21/206; G01C 21/3859; G01C 21/005; G01C 21/20; G06Q 10/02
USPC .......................................................... 701/3
See application file for complete search history.

(56) References Cited

U.S. PATENT DOCUMENTS

| | | | |
|---|---|---|---|
| 7,415,331 B2 | 8/2008 | Dapp et al. | |
| 7,451,023 B2 | 11/2008 | Appleby et al. | |
| 7,737,878 B2 | 6/2010 | Van Tooren et al. | |
| 8,914,182 B2 | 12/2014 | Casado et al. | |
| 8,948,935 B1 | 2/2015 | Peeters et al. | |
| 9,169,030 B2 | 10/2015 | Wong et al. | |
| 9,317,034 B2 | 4/2016 | Hoffman et al. | |
| 9,405,181 B2 | 8/2016 | Wong et al. | |
| 9,464,907 B1 | 10/2016 | Hoareau et al. | |
| 9,523,986 B1 | 12/2016 | Abebe et al. | |
| 9,567,077 B2 | 2/2017 | Mullan et al. | |
| 9,691,285 B2 | 6/2017 | Jarrell | |
| 9,713,675 B2 | 7/2017 | Levien et al. | |
| 9,720,519 B2 | 8/2017 | Verma | |
| 9,754,496 B2 | 9/2017 | Chan et al. | |
| 9,760,087 B2 | 9/2017 | Hoareau et al. | |
| 9,798,329 B2 | 10/2017 | Shattil | |
| 9,835,709 B2 | 12/2017 | Tran et al. | |
| 9,848,459 B2 | 12/2017 | Darrow et al. | |
| 9,854,206 B1 | 12/2017 | Ren et al. | |
| 9,861,075 B2 | 1/2018 | Shen et al. | |
| 9,896,202 B2 | 2/2018 | Jourdan | |
| 9,940,525 B2 | 4/2018 | Wolf | |
| 9,943,965 B2 | 4/2018 | Moore | |
| 9,977,428 B2 | 5/2018 | Hall | |
| 9,984,579 B1 | 5/2018 | Harris et al. | |
| 9,986,378 B2 | 5/2018 | Jones | |
| 10,050,760 B2 | 8/2018 | Ross et al. | |
| 10,073,336 B2 | 9/2018 | Maes et al. | |
| 10,155,166 B1 | 12/2018 | Taylor et al. | |
| 10,159,218 B2 | 12/2018 | Shen et al. | |
| 10,203,701 B2 | 2/2019 | Kurdi et al. | |
| 10,254,766 B2 | 4/2019 | High et al. | |
| 10,269,257 B1 | 4/2019 | Gohl et al. | |
| 10,274,952 B2 | 4/2019 | Cantrell et al. | |
| 10,308,430 B1 | 6/2019 | Brady et al. | |
| 10,313,638 B1 | 6/2019 | Yeturu et al. | |
| 10,325,506 B2 | 6/2019 | Goddemeier et al. | |
| 10,331,124 B2 | 6/2019 | Ferguson et al. | |
| 10,332,394 B2 | 6/2019 | Gomez Gutierrez et al. | |
| 10,354,537 B2 | 7/2019 | Beaurepaire et al. | |
| 10,372,122 B2 | 8/2019 | Zach | |
| 10,438,494 B1 * | 10/2019 | Hahn .................. G08G 5/0013 | |
| 10,440,229 B2 | 10/2019 | Drako | |
| 10,441,020 B1 | 10/2019 | Andon et al. | |
| 10,453,345 B2 | 10/2019 | Greenberger et al. | |
| 10,467,885 B2 | 11/2019 | Trundle et al. | |
| 10,481,600 B2 | 11/2019 | Yen et al. | |
| 10,501,180 B2 | 12/2019 | Yu | |
| 10,565,395 B2 | 2/2020 | Matusek et al. | |
| 10,586,464 B2 | 3/2020 | Dupray et al. | |
| 10,600,326 B2 | 3/2020 | Kim et al. | |
| 10,607,462 B2 | 3/2020 | Drako | |
| 10,636,297 B2 | 4/2020 | Wang et al. | |
| 10,643,406 B2 | 5/2020 | Arya et al. | |
| 10,654,482 B2 | 5/2020 | Urano et al. | |
| 10,655,968 B2 | 5/2020 | Rezvani | |
| 10,672,278 B2 | 6/2020 | Deluca et al. | |
| 10,676,022 B2 | 6/2020 | Zevenbergen et al. | |
| 10,683,088 B2 | 6/2020 | Erickson et al. | |
| 10,706,634 B1 | 7/2020 | Baumbach et al. | |
| 10,748,429 B2 | 8/2020 | Bosworth | |
| 10,761,544 B2 | 9/2020 | Anderson et al. | |
| 10,762,795 B2 | 9/2020 | Contreras et al. | |
| 10,762,797 B2 | 9/2020 | Navot et al. | |
| 10,765,378 B2 | 9/2020 | Hall et al. | |
| 10,818,187 B2 | 10/2020 | Perko | |
| 10,954,067 B1 * | 3/2021 | Theobald ................ B25J 19/022 | |
| 2005/0259150 A1 | 11/2005 | Furumi et al. | |
| 2007/0288132 A1 | 12/2007 | Lam | |
| 2008/0129544 A1 * | 6/2008 | Augst ................. B62D 15/0285 | |
| | | | 340/932.2 |
| 2015/0202770 A1 | 7/2015 | Patron et al. | |
| 2015/0269258 A1 | 9/2015 | Hunt, Jr. | |
| 2015/0350614 A1 | 12/2015 | Meier et al. | |
| 2016/0214717 A1 | 7/2016 | De Silva | |
| 2016/0246297 A1 | 8/2016 | Song | |
| 2016/0327956 A1 * | 11/2016 | Zhang ...................... G01C 5/00 | |
| 2016/0373699 A1 | 12/2016 | Torres et al. | |
| 2017/0081026 A1 | 3/2017 | Winn et al. | |
| 2017/0278409 A1 | 9/2017 | Johnson et al. | |
| 2017/0291608 A1 | 10/2017 | Engel et al. | |
| 2017/0368413 A1 | 12/2017 | Shavit | |
| 2018/0009547 A1 * | 1/2018 | Brewer .................. B64D 33/04 | |
| 2018/0035606 A1 | 2/2018 | Burdoucci | |
| 2018/0072416 A1 | 3/2018 | Cantrell et al. | |
| 2018/0136659 A1 | 5/2018 | Matloff | |
| 2018/0162504 A1 | 6/2018 | Lindsø | |
| 2018/0232580 A1 | 8/2018 | Wolf | |
| 2018/0239343 A1 * | 8/2018 | Voorhies ............... G05D 1/0289 | |
| 2018/0259960 A1 | 9/2018 | Cuban et al. | |
| 2018/0267601 A1 * | 9/2018 | Yoon ....................... G06F 3/011 | |
| 2018/0308130 A1 | 10/2018 | Hafeez et al. | |
| 2018/0330316 A1 * | 11/2018 | Rajkhowa ............ G06Q 10/087 | |
| 2019/0035128 A1 | 1/2019 | Russell | |
| 2019/0051224 A1 | 2/2019 | Marshall et al. | |
| 2019/0052852 A1 | 2/2019 | Schick et al. | |
| 2019/0061942 A1 | 2/2019 | Miller | |
| 2019/0112048 A1 | 4/2019 | Culver | |
| 2019/0135450 A1 | 5/2019 | Zhou et al. | |
| 2019/0185158 A1 | 6/2019 | Blake et al. | |
| 2019/0197254 A1 | 6/2019 | Salgar | |
| 2019/0227557 A1 | 7/2019 | Kim et al. | |
| 2019/0238338 A1 | 8/2019 | OBrien et al. | |
| 2019/0302791 A1 * | 10/2019 | Nageswaran ........ G05D 1/0088 | |
| 2019/0324456 A1 | 10/2019 | Ryan et al. | |
| 2019/0339712 A1 | 11/2019 | Williams et al. | |
| 2019/0369641 A1 | 12/2019 | Gillett | |
| 2019/0377345 A1 | 12/2019 | Bachrach et al. | |
| 2020/0012284 A1 * | 1/2020 | Morita ................. G05D 1/0016 | |
| 2020/0014759 A1 | 1/2020 | Wunderlich | |
| 2020/0032484 A1 | 1/2020 | ODonnell | |
| 2020/0042013 A1 | 2/2020 | Kelkar et al. | |
| 2020/0043347 A1 | 2/2020 | Wartofsky | |
| 2020/0066147 A1 | 2/2020 | Vadillo et al. | |
| 2020/0066163 A1 | 2/2020 | Emsbach et al. | |
| 2020/0082731 A1 | 3/2020 | Choi et al. | |
| 2020/0094964 A1 | 3/2020 | Myslinski | |
| 2020/0103882 A1 | 4/2020 | Sullivan et al. | |
| 2020/0130827 A1 | 4/2020 | Kozak | |
| 2020/0145619 A1 | 5/2020 | Drako | |
| 2020/0183384 A1 | 6/2020 | Noh et al. | |
| 2020/0207371 A1 | 7/2020 | Dougherty et al. | |
| 2020/0250848 A1 | 8/2020 | Kim et al. | |
| 2020/0262450 A1 | 8/2020 | Pan | |

(56) References Cited

U.S. PATENT DOCUMENTS

| | | | |
|---|---|---|---|
| 2020/0265701 A1 | 8/2020 | Schenker et al. | |
| 2020/0265723 A1 | 8/2020 | Gordon et al. | |
| 2020/0273353 A1 | 8/2020 | OConnell et al. | |
| 2020/0341471 A1 | 10/2020 | Kozak | |
| 2020/0356115 A1 | 11/2020 | Kubie | |
| 2020/0357288 A1 | 11/2020 | Stewart et al. | |
| 2020/0380876 A1* | 12/2020 | Sachdeva | G01C 21/20 |

FOREIGN PATENT DOCUMENTS

| | | |
|---|---|---|
| EP | 3525157 A1 | 8/2019 |
| EP | 3667451 A1 | 6/2020 |
| KR | 102160722 B1 | 9/2020 |
| TW | I693959 B | 5/2020 |
| WO | 2016210156 A1 | 12/2016 |
| WO | 2017055080 A1 | 4/2017 |
| WO | 2017065107 A1 | 4/2017 |
| WO | 2017068224 A1 | 4/2017 |
| WO | 2017157863 A1 | 9/2017 |
| WO | 2018052352 A1 | 3/2018 |
| WO | 2019006769 A1 | 1/2019 |
| WO | 2019235667 A1 | 12/2019 |
| WO | 2020057887 A1 | 3/2020 |
| WO | 2020072387 A1 | 4/2020 |

OTHER PUBLICATIONS

Graether, et al., Joggobot: A Flying Robot as Jogging Companion, CHI 2012, May 5, 2012, exertiongameslab.org downloaded from https://exertiongameslab.org/wp-content/uploads/2011/07/joggobot_chi2012.pdf, pp. 263-264.

Al Zayer, Majed, et al. "Exploring the Use of a Drone to Guide Blind Runners", Proceedings of the 18th International ACM SIGACCESS Conference on Computers and Accessibility, 2016, downloaded from https://rrl.cse.unr.edu/media/documents/2016/p263-alzayer.pdf.

Alshareef, Hazzaa N., and Dan Grigoras "An adaptive task scheduler for a cloud of drones", 2018 4th International Conference on Cloud Computing Technologies and Applications (Cloudtech), IEEE, Nov. 2018, 9 pages.

Altawy, Riham and Youssef, Amr. M., "Security, Privacy, and Safety Aspects of Civilian Drones: A Survey", researchgate.net, ACM Transactions on Cyber-Physical Systems, Nov. 2016, 25 pages.

Amato, Andrew, "Projector Drone Turns Any Surface Into a Video Screen," DRONELIFE.com, dronelife.com, Jun. 26, 2014, 2 pages, downloaded from https://web.archive.org/web/20140804122610/https://dronelife.com/2014/06/26/projector-drone-turns-surface-video-screen/.

Bertram, Joshua R., Peng Wei, and Joseph Zambreno. "Scalable FastMDP for Pre-departure Airspace Reservation and Strategic De-conflict." arXiv preprint arXiv:2008.03518 (2020).

Blank, Peter; Kirrane, Sabrina; and Spiekerman, Sarah. "Privacy-Aware Restricted Areas for Unmanned Aerial Systems", computer.org. IEEE Computer and Reliability Societies, Mar./Apr. 2018, vol. 16, pp. 70-79.

Brock, Anke M., et al. "FlyMap: Interacting with Maps Projected from a Drone", Proceedings of the 7th ACM International Symposium on Pervasive Displays. 2018, 9 pages.

Bui, Khac-Hoai Nam, and Jason J. Jung, "Internet of agents framework for connected vehicles: A case study on distributed traffic control system", J. Parallel Distrib. Comput., (2017), 26 pages.

Cameron, Lori, "Building a Framework to Protect Your Privacy from Drones," computer.org. Accessed, Nov. 10, 2020, IEEE Computer Society, (2020), 2 pages.

Choi, Han-Lim, Luc Brunet, and Jonathan P. How, "Consensus-Based Decentralized Auctions for Robust Task Allocation", Robotics, IEEE Transactions on Robotics 25.4 (2009): 912-926.

Colley, Ashley, et al. "Investigating Drone Motion as Pedestrian Guidance", Proceedings of the 16th International Conference on Mobile and Ubiquitous Multimedia, 2017, 9 pages.

Frias-Martinez, Vanessa, Elizabeth Sklar, and Simon Parsons, "Exploring auction mechanisms for role assignment in teams of autonomous robots," Robot Soccer World Cup. Springer, Berlin, Heidelberg, 2004,12 pages.

Irfan, Muhammad, and Adil Farooq, "Auction-based Task Allocation Scheme for Dynamic Coalition Formations in Limited Robotic Swarms with Heterogeneous Capabilities," 2016 International Conference on Intelligent Systems Engineering(ICISE). IEEE, 2016.

Isop, W., Pestana, J., Ermacora, G., Fraundorfer, F. & Schmalstieg, D., "Micro Aerial Projector—Stabilizing Projected Images Of An Airborne Robotics Projection Platform", 2016 IEEE/RSJ International conference on Intelligent Robots and Systems (IROS), Daejeon convention Center, Oct. 2016, pp. 5618-5625.

Kamali, Maryam, et al. "Formal verification of autonomous vehicle platooning", Science of Computer Programming 148 (2017), 88-106 19 pages.

Lee, Eun-Kyu, et al., "Internet of Vehicles: From intelligent grid to autonomous cars and vehicular fogs", International Journal of Distributed Sensor Networks, vol. 12, No. 9, (2016), 14 pages.

Lucien, Laurent, et al., "A Proposition of Data Organization and Exchanges to Collaborate in an Autonomous Agent context", 2016 IEEE Intl Conference on Computational Science and Engineering (CSE) and IEEE Intl Conference on Embedded and Ubiquitous Computing (EUC) and 15th Intl Symposium on Distributed Computing and Applications for Business Engineering (DCABES), IEEE, 2016, 8 pages.

Minaeian, S., Liu, J., & Son, Y. (2018). "Effective and Efficient Detection of Moving Targets From a UAVs Camera", IEEE Transactions on Intelligent Transportation Systems, vol. 19, No. 2, Feb. 2018, pp. 497-506.

Pongpunwattana, Anawat, and Rolf Rysdyk. "Real-time planning for multiple autonomous vehicles in dynamic uncertain environments", Journal of Aerospace Computing, Information, and Communication 1.12 (2004): 580-604.

Porfiri, Maurizio, D. Gray Roberson, and Daniel J. Stilwell, "Tracking and Formation Control of Multiple Autonomous Agents: A two-level consensus approach", Automatica vol. 43, No. 8 (2007), pp. 1318-1328.

Raboin, Eric, et al. "Model-predictive asset guarding by team of autonomous surface vehicles in environment with civilian boats", Autonomous Robots 38.3 (2015), pp. 261-282.

Scheible, J. Funk, M. (2016). "In-Situ-DisplayDrone: Facilitating Co-located Interactive Experiences via A Flying Screen", In Proceedings of the 5th ACM International Symposium on Pervasive Displays (PerDis '16). Association for Computing Machinery, 251-252.

Scheible, Jurgen, et al. "Displaydrone: A Flying Robot Based Interactive Display", Proceedings of the 2nd ACM International Symposium on Pervasive Displays, 2013, 6 pages.

Schneider, Eric, et al. "Auction-based task allocation for multi-robot teams in dynamic environments." Conference Towards Autonomous Robotic Systems. Springer, Cham, 2015.

Xiang, Xianbo, Bruno Jouvencel, and Olivier Parodi, "Coordinated Formation Control of Multiple Autonomous Underwater Vehicles for Pipeline Inspection", International Journal of Advanced Robotic Systems, vol. 7, No. 1 (2010), pp. 075-084.

Yaacoub, Jean-Paul et al.,"Security analysis of drones systems: Attacks, limitations, and recommendations", Internet of Things 11, 2020, 40 pages.

Yu, Jun, et al. "iPrivacy: image privacy protection by identifying sensitive objects via deep multi-task learning." IEEE Transactions on Information Forensics and Security, vol. 12, No. 5, (2017): 1005-1016.

Zhu, Guodong, and Peng Wei. "Pre-Departure Planning for Urban Air Mobility Flights with Dynamic Airspace Reservation", AIAA Aviation 2019 Forum, 2019, 11 pages, downloaded from https://cpb-us-W2.wpmucdn.com/web.seas.gwu.edu/dist/9/15/files/2019/07/aviation19_PredeparturePlanning.pdf.

* cited by examiner

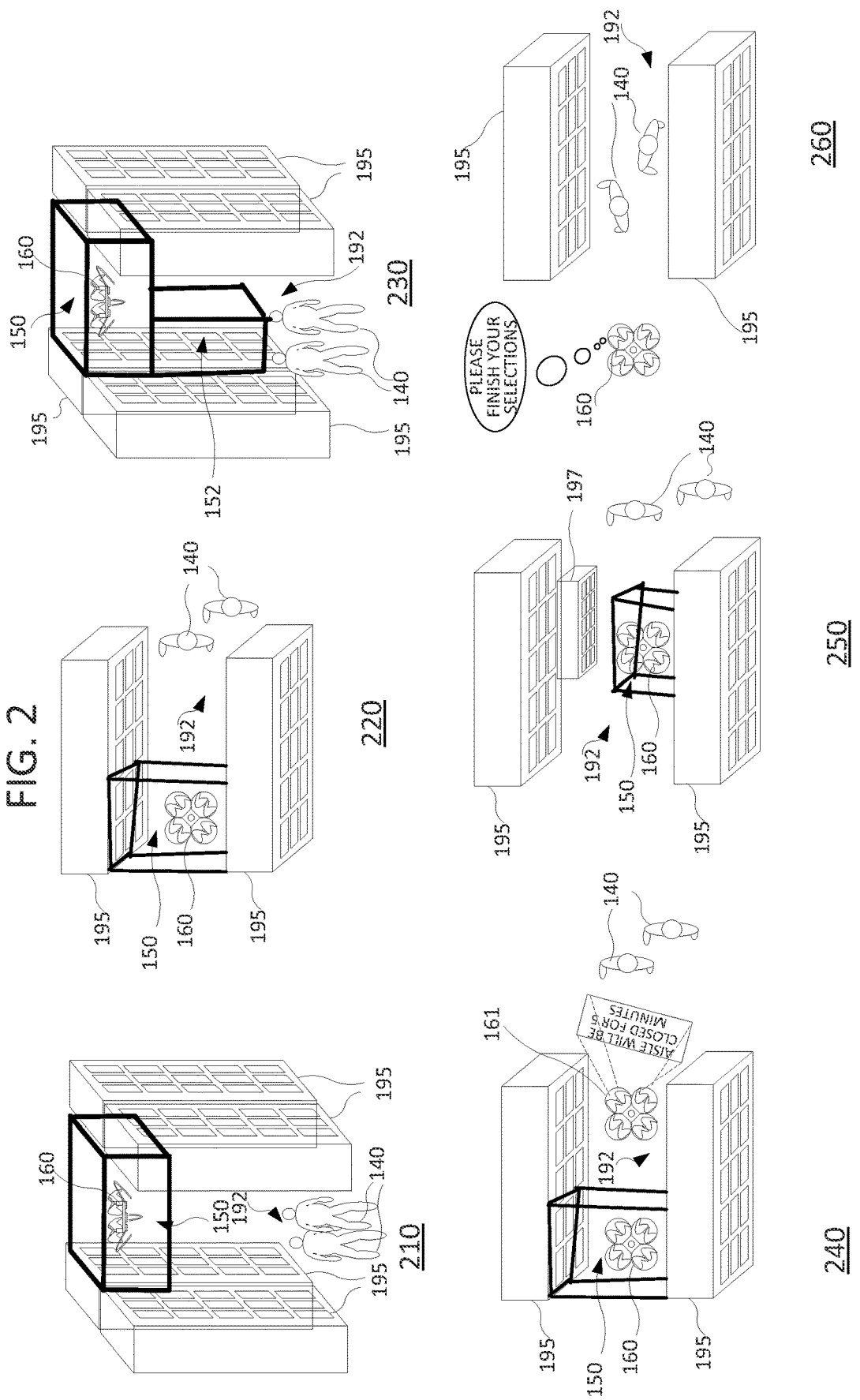

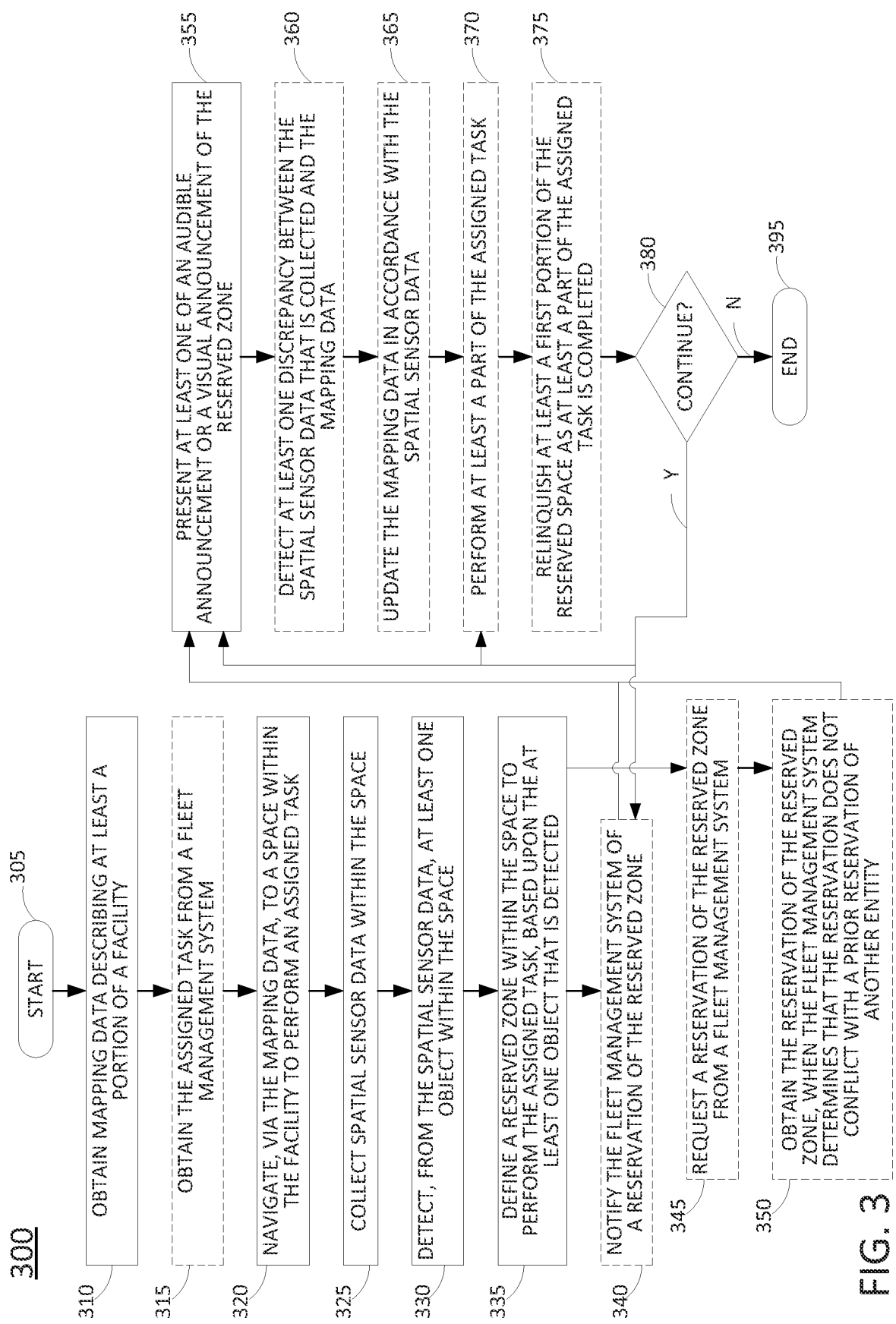

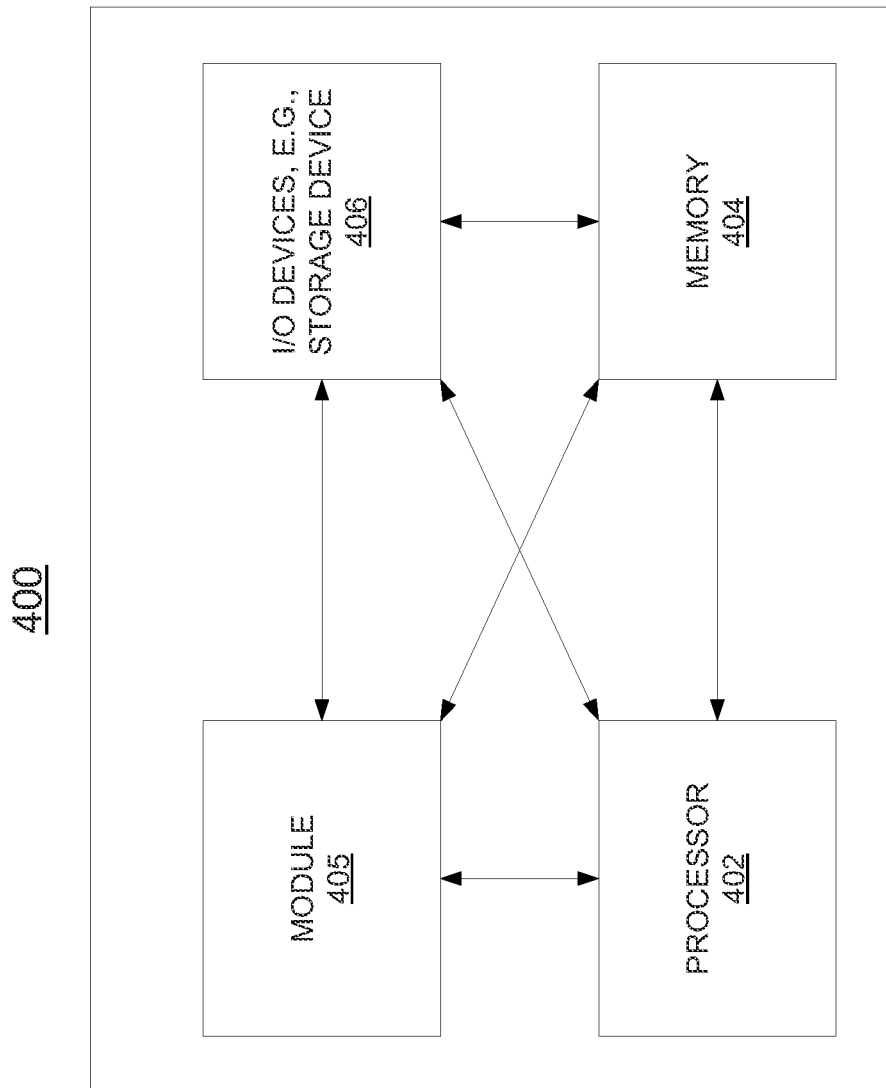

AUTONOMOUS AERIAL VEHICLE AIRSPACE CLAIMING AND ANNOUNCING

The present disclosure relates generally to autonomous vehicle operations, and more particularly to methods, computer-readable media, and apparatuses for an autonomous aerial vehicle to define a reserved zone within a space to perform an assigned task, based upon at least one object that is detected, and to present an announcement of the reserved zone.

BACKGROUND

Current trends in wireless technology are leading towards a future where virtually any object can be network-enabled and addressable on-network. The pervasive presence of cellular and non-cellular wireless networks, including fixed, ad-hoc, and/or or peer-to-peer wireless networks, satellite networks, and the like along with the migration to a 128-bit IPv6-based address space provides the tools and resources for the paradigm of the Internet of Things (IoT) to become a reality. In addition, drones or autonomous aerial vehicles (AAVs) are increasingly being utilized for a variety of commercial and other useful tasks, such as package deliveries, search and rescue, mapping, surveying, and so forth, enabled at least in part by these wireless communication technologies.

SUMMARY

In one example, the present disclosure describes a method, computer-readable medium, and apparatus for an autonomous aerial vehicle to define a reserved zone within a space to perform an assigned task, based upon at least one object that is detected, and to present an announcement of the reserved zone. For instance, in one example, a processing system of an autonomous aerial vehicle including at least one processor may obtain mapping data describing at least a portion of a facility, navigate, via the mapping data, to a space within the facility to perform an assigned task, and collect spatial sensor data within the space. The processing system may then detect, from the spatial sensor data, at least one object within the space, define a reserved zone within the space to perform the assigned task, based upon the at least one object that is detected, and present at least one of an audible announcement or a visual announcement of the reserved zone.

BRIEF DESCRIPTION OF THE DRAWINGS

The teaching of the present disclosure can be readily understood by considering the following detailed description in conjunction with the accompanying drawings, in which:

FIG. 2 illustrates example scenes of an autonomous aerial vehicle defining a reserved zone within a space to perform an assigned task, based upon at least one object that is detected, and presenting an announcement of the reserved zone, in accordance with the present disclosure;

FIG. 3 illustrates a flowchart of an example method for an autonomous aerial vehicle to define a reserved zone within a space to perform an assigned task, based upon at least one object that is detected, and to present an announcement of the reserved zone; and FIG. 4 illustrates an example high-level block diagram of a computing device specifically programmed to perform the steps, functions, blocks, and/or operations described herein.

To facilitate understanding, identical reference numerals have been used, where possible, to designate identical elements that are common to the figures.

DETAILED DESCRIPTION

Figure 1:
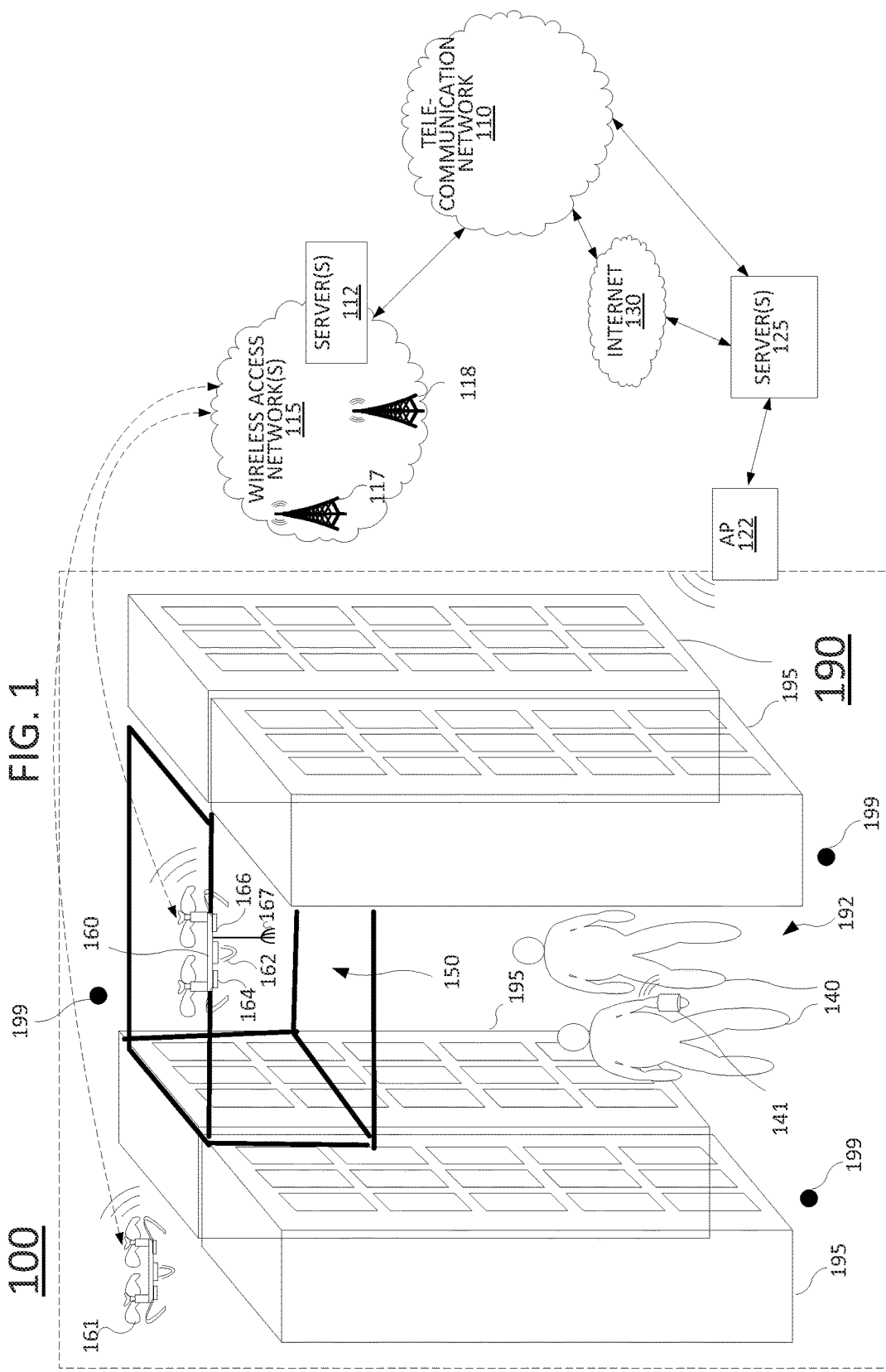
FIG. 1 illustrates an example system related to the present disclosure.

Examples of the present disclosure describe methods, computer-readable media, and apparatuses for an autonomous aerial vehicle to define a reserved zone within a space to perform an assigned task, based upon at least one object that is detected, and to present an announcement of the reserved zone. In particular, examples of the present disclosure relate to an autonomous aerial vehicle (AAV) identifying and claiming an area of space for a period of time in order to accomplish a task. The AAV may also announce its use of the airspace to other AAVs or people nearby. An AAV may be employed to perform periodic tasks within an airspace. When performing the task, the airspace in which the AAV operates may overlap with areas of space, or may be near areas of space that may be used by other AAVs, machinery, and people. Thus, examples of the present disclosure describe an AAV obtaining an assigned task, identifying an airspace needed to perform the task, claiming/reserving the airspace for a temporary period of time, announcing the AAV's use of the airspace in an audible and/or visual format for human consumption, and releasing the claim/reservation to the airspace when the task is completed.

To illustrate, an AAV may be equipped with sensors such as a visible light camera, an infrared camera, a light projection system, image analysis software, such as a bar code or quick response (QR) code reader, a light detection and ranging (LiDAR) unit, and other sensors. In one example, the AAV may traverse an area of space of a facility (e.g., an enclosed facility like a warehouse or an open or unenclosed facility like a storage yard), such as the interior of a warehouse, for the purpose of generating a three-dimensional (3D) map of the facility, e.g., via LiDAR imaging/rendering. This mapping may be performed when the area of space of the facility is empty of other mobile objects such as people, machinery, and other AAVs. The 3D map of the area of space may be stored in a mapping database (e.g., maintained by a fleet management system, or command center) and/or onboard the AAV. In one example, the AAV may subsequently receive a command from a fleet management system to perform a task within the area of space. For example, the command may be to retrieve an item from an upper shelf, to check inventory via a code scanner, capture a video or still image, lead a customer to an area of the warehouse, interact with a person, etc. The command may contain a location for the assigned task to be performed. For example, the command may instruct the AAV to take inventory in an aisle of the warehouse. The AAV may navigate to the aisle using the established mapping of the area. Upon reaching the area for the task to be performed, the AAV may use its onboard LIDAR, video, motion, heat, infrared, and other sensors to detect other objects within the area of space that are not present in the current mapping database.

For example, the AAV may capture new LiDAR readings and update the mapping database by sensing semifixed items (or "moveable fixtures") that have been moved within the area of space, such as a new shelf. The AAV may also sense the presence and location of other non-permanent objects in the area of space, such as people, machinery, products on or near the shelves, and other AAVs. This data may be used by the AAV to calculate an available airspace to claim temporarily for performing the assigned task, e.g., a "reserved zone."

The AAV may determine that no other AAVs are in the aisle via its own sensors. Further, the AAV may gather data from other AAVs and other machines, such as smart forklifts, via the fleet management system and/or via local sensing. For instance, moveable fixtures, vehicles, other equipment, personnel, etc. may have radio frequency identification (RFID) tags and/or transponders that may be sensed by the AAV using an on-board RFID reader/scanner. In another example, the AAV may communicate with other AAVs or other non-aerial autonomous vehicles (AVs) via direct/peer-to-peer communications, such as via Institute of Electrical and Electronics Engineers (IEEE) 802.11 based communications (e.g., Wi-Fi Direct) Long Term Evolution (LTE) Direct, a 5G device-to-device (D2D) sidelink, such as over a P5 interface, and so forth), via Dedicated Short Range Communications (DSRC), e.g., in the 5.9 MHz band, or the like, and so on. In one example, other planned routes of machinery and AAVs may be maintained and controlled by the fleet management system. In one example, the AAV may obtain information of these other planned routes to anticipate a potential conflict. If no obstacles are detected by the AAV in the area of space, the AAV may claim the entire x-y-z coordinates of the aisle as its temporary airspace (e.g., "reserved zone") and report these coordinates to the fleet management system. If any other machines, AAVs, or people are detected within the area, the AAV may detect an unoccupied area that is represented by x-y-z coordinates that are a subset of the entire aisle to temporarily claim as its reserved zone and likewise report these coordinates to the fleet management system. For instance, the AAV may calculate the tallest person or forklift in the aisle and temporarily claim all airspace above that height or an area slightly above that height (e.g., 5, 10 or 15 feet above) as the reserved zone. This results in a set of x-y-z coordinates that is sent to the fleet management system. The AAV may also communicate these coordinates directly to other AAVs or non-aerial autonomous vehicles (AVs) nearby (e.g., via direct, peer-to-peer wireless communications, or via notification via the fleet management system and/or one or more components of a communication network).

Since the AAV maintains mapping data for the area, the AAV may use the mapping data to translate the x-y-z claimed airspace coordinates into human-friendly terms that it may use to audibly announce its airspace plans to any nearby person. The AAV may optionally calculate an estimated time of completion of the task and notify the fleet management system and nearby people. The AAV may also use an onboard projector or other light source(s) to project an image that demarks the reserved space in which the AAV is performing the task. For instance, the AAV may project visible light to be seen by people in the immediate area. In one example, the AAV may also display information for human consumption regarding the reserved zone. For instance, the AAV may cause a projector to display warning information, such as: "AAV in operation—aisle closed for "x" minutes," or other informational data of the same or a similar nature on the ground or other surfaces near the reserved zone.

In one example, the AAV may also project infrared light to be sensed by other AAVs or machines. However, as noted above, in one example, other AAVs or AVs may be notified via direct, peer-to-peer wireless communications or via the fleet management system. In one example, as people, other AAVs, or other machines move, additional airspace may become available for the AAV to claim. The AAV may analyze its surroundings on an ongoing basis to make adjustments to the reserved zone. Likewise, once the AAV has completed the portion of the task within the reserved zone, it may relinquish that portion of the airspace that it had reserved if it is no longer needed for the remainder of the task. In this manner, the AAV may continuously announce a revised set of x-y-z coordinates that represent the airspace that the AAV need as its reserved zone, and that the AAV has determined is available for it to occupy to complete the remainder of the task. These and other aspects of the present disclosure are discussed in greater detail below in connection with the examples of FIGS. 1-4.

To aid in understanding the present disclosure, FIG. 1 illustrates an example system 100, related to the present disclosure. As shown in FIG. 1, the system 100 connects user device 141, server(s) 112, server(s) 125, and autonomous aerial vehicles (AAVs 160-161), with one another and with various other devices via a core network, e.g., a telecommunication network 110, a wireless access network 115 (e.g., a cellular network), and Internet 130.

In one example, the server(s) 125 may each comprise a computing device or processing system, such as computing system 400 depicted in FIG. 4, and may be configured to perform one or more steps, functions, or operations for an autonomous aerial vehicle to define a reserved zone within a space to perform an assigned task, based upon at least one object that is detected, and to present an announcement of the reserved zone. For instance, an example method for an autonomous aerial vehicle to define a reserved zone within a space to perform an assigned task, based upon at least one object that is detected, and to present an announcement of the reserved zone is illustrated in FIG. 3 and described below. In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 4 and discussed below) or multiple computing devices collectively configured to perform various steps, functions, and/or operations in accordance with the present disclosure.

In one example, server(s) 125 may comprise an AAV fleet management system or a network-based AAV support service. For instance, server(s) 125 may receive and store information regarding AAVs, such as (for each AAV): an identifier of the AAV, a maximum operational range of the AAV, a current operational range of the AAV, capabilities or features of the AAV, such as maneuvering capabilities, payload/lift capabilities (e.g., including maximum weight, volume, etc.), sensor and recording capabilities, lighting capabilities, visual projection capabilities, sound broadcast capabilities, and so forth. In one example, server(s) 125 may manage or support AAVs that are deployed for performing tasks within or at a facility 190. For instance, server(s) 125 may obtain requests to perform tasks from personnel of the facility 190, other automated systems, etc., may assign AAVs to particular tasks, may track task completions, and so forth. Server(s) 125 may also store a map or mapping data of facility 190, and provide the map or mapping data to AAVs or other non-aerial autonomous vehicles (AVs), may update the map or mapping data as new information is collected form AAVs, and so forth.

In addition, server(s) 125 may store detection models that may be applied to sensor data from AAVs, e.g., in order to detect items or objects (which may include humans or animals). For instance, in one example, AAVs may include on-board processing systems with one or more detection models for detecting items or objects. However, as an alternative, or in addition, AAVs may transmit sensor data to server(s) 125, which may apply detection models to the sensor data in order to similarly detect items or objects.

The MLMs, or signatures, may be specific to particular types of visual/image and/or spatial sensor data, or may take multiple types of sensor data as inputs. For instance, with respect to images or video, the input sensor data may include low-level invariant image data, such as colors (e.g., RGB (red-green-blue) or CYM (cyan-yellow-magenta) raw data (luminance values) from a CCD/photo-sensor array), shapes, color moments, color histograms, edge distribution histograms, etc. Visual features may also relate to movement in a video and may include changes within images and between images in a sequence (e.g., video frames or a sequence of still image shots), such as color histogram differences or a change in color distribution, edge change ratios, standard deviation of pixel intensities, contrast, average brightness, and the like. For instance, these features could be used to help quantify and distinguish shimmering water, a flag on a flagpole, etc. from other types of images/ object and/or other features.

As noted above, in one example, MLMs, or signatures, may take multiple types of sensor data as inputs. For instance, MLMs or signatures may also be provided for detecting particular items based upon LiDAR input data, infrared camera input data, and so on. In accordance with the present disclosure, a detection model may comprise a machine learning model (MLM) that is trained based upon the plurality of features available to the system (e.g., a "feature space"). For instance, one or more positive examples for a feature may be applied to a machine learning algorithm (MLA) to generate the signature (e.g., a MLM). In one example, the MLM may comprise the average features representing the positive examples for an item in a feature space. Alternatively, or in addition, one or more negative examples may also be applied to the MLA to train the MLM. The machine learning algorithm or the machine learning model trained via the MLA may comprise, for example, a deep learning neural network, or deep neural network (DNN), a generative adversarial network (GAN), a support vector machine (SVM), e.g., a binary, non-binary, or multi-class classifier, a linear or non-linear classifier, and so forth. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. It should be noted that various other types of MLAs and/or MLMs may be implemented in examples of the present disclosure, such as k-means clustering and/or k-nearest neighbor (KNN) predictive models, support vector machine (SVM)-based classifiers, e.g., a binary classifier and/or a linear binary classifier, a multi-class classifier, a kernel-based SVM, etc., a distance-based classifier, e.g., a Euclidean distance-based classifier, or the like, and so on. In one example, a trained detection model may be configured to process those features which are determined to be the most distinguishing features of the associated item, e.g., those features which are quantitatively the most different from what is considered statistically normal or average from other items that may be detected via a same system, e.g., the top 20 features, the top 50 features, etc.

In one example, detection models (e.g., MLMs) may be deployed in AAVs, and/or in a network-based processing system to process sensor data from one or more AAV sensor sources (e.g., cameras, LiDAR, and/or other sensors of AAVs), and to identify patterns in the features of the sensor data that match the detection model(s) for the respective item(s). In one example, a match may be determined using any of the visual features mentioned above, e.g., and further depending upon the weights, coefficients, etc. of the particular type of MLM. For instance, a match may be determined when there is a threshold measure of similarity among the features of the sensor data streams(s) and an item signature.

In one example, the system 100 includes a telecommunication network 110. In one example, telecommunication network 110 may comprise a core network, a backbone network or transport network, such as an Internet Protocol (IP)/multi-protocol label switching (MPLS) network, where label switched routes (LSRs) can be assigned for routing Transmission Control Protocol (TCP)/IP packets, User Datagram Protocol (UDP)/IP packets, and other types of protocol data units (PDUs), and so forth. It should be noted that an IP network is broadly defined as a network that uses Internet Protocol to exchange data packets. However, it will be appreciated that the present disclosure is equally applicable to other types of data units and transport protocols, such as Frame Relay, and Asynchronous Transfer Mode (ATM). In one example, the telecommunication network 110 uses a network function virtualization infrastructure (NFVI), e.g., host devices or servers that are available as host devices to host virtual machines comprising virtual network functions (VNFs). In other words, at least a portion of the telecommunication network 110 may incorporate software-defined network (SDN) components.

In one example, one or more wireless access networks 115 may each comprise a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network(s) 115 may each comprise an access network in accordance with any "second generation" (2G), "third generation" (3G), "fourth generation" (4G), Long Term Evolution (LTE), "fifth generation" (5G), or any other existing or yet to be developed future wireless/cellular network technology. While the present disclosure is not limited to any particular type of wireless access network, in the illustrative example, base stations 117 and 118 may each comprise a Node B, evolved Node B (eNodeB), or gNodeB (gNB), or any combination thereof providing a multi-generational/multi-technology-capable base station. In the present example, user device 141, AAV 160, and AAV 161 may be in communication with base stations 117 and 118, which provide connectivity between user device, 141, AAVs 160-161, and other endpoint devices within the system 100, various network-based devices, such as server(s) 112, server(s) 125, and so forth. In one example, wireless access network(s) 115 may be operated by the same service provider that is operating telecommunication network 110, or one or more other service providers.

For instance, as shown in FIG. 1, wireless access network(s) 115 may also include one or more servers 112, e.g., edge servers at or near the network edge. In one example, each of the server(s) 112 may comprise a computing device or processing system, such as computing system 400 depicted in FIG. 4 and may be configured to provide one or more functions in support of examples of the present disclosure for an autonomous aerial vehicle to define a reserved zone within a space to perform an assigned task, based upon at least one object that is detected, and to present an announcement of the reserved zone. For example, one or more of the server(s) 112 may be configured to perform one or more steps, functions, or operations in connection with the example method 300 described below. In one example, server(s) 112 may perform the same or similar functions as server(s) 125. For instance, telecommunication network 110 may provide a fleet management system, e.g., as a service to one or more subscribers/customers, in addition to telephony services, data communication services, television services, etc. In one example, server(s) 112 may operate in conjunction with server(s) 125 to provide an AAV fleet management system and/or a network-based AAV support service. For instance, server(s) 125 may provide more centralized services, such as AAV authorization and tracking, maintaining user accounts, creating new accounts, tracking account balances, accepting payments for services, etc., while server(s) 112 may provide more operational support to AAVs, such as deploying MLMs/detection models for detecting objects, for obtaining location information of user devices (e.g., from a cellular/wireless network service provider, such as an operator of telecommunication network 110 and wireless access network(s) 115), and providing such information to AAVs, and so on. It is noted that this is just one example of a possible distributed architecture for an AAV fleet management system and/or a network-based AAV support service. Thus, various other configurations including various data centers, public and/or private cloud servers, and so forth may be deployed. For ease of illustration, various additional elements of wireless access network(s) 115 are omitted from FIG. 1.

As illustrated in FIG. 1, user device 141 may comprise, for example, a wireless enabled wristwatch. In various examples, user device 141 may comprise a cellular telephone, a smartphone, a tablet computing device, a laptop computer, a head-mounted computing device (e.g., smart glasses), or any other wireless and/or cellular-capable mobile telephony and computing devices (broadly, a "mobile device" or "mobile endpoint device"). In one example, user device 141 may be equipped for cellular and non-cellular wireless communication. For instance, user device 141 may include components which support peer-to-peer and/or short range wireless communications. Thus, user device 141 may include one or more radio frequency (RF) transceivers, e.g., for cellular communications and/or for non-cellular wireless communications, such as for IEEE 802.11 based communications (e.g., Wi-Fi, Wi-Fi Direct), IEEE 802.15 based communications (e.g., Bluetooth, Bluetooth Low Energy (BLE), and/or ZigBee communications), and so forth. In another example, user device 141 may instead comprise a radio frequency identification (RFID) tag that may be detected by AAVs.

In accordance with the present disclosure, AAV 160 may include a camera 162 and one or more radio frequency (RF) transceivers 166 for cellular communications and/or for non-cellular wireless communications. In one example, AAV 160 may also include one or more module(s) 164 with one or more additional controllable components, such as one or more: microphones, loudspeakers, infrared, ultraviolet, and/or visible spectrum light sources, projectors, light detection and ranging (LiDAR) unit(s), temperature sensors (e.g., thermometers), and so forth. In addition, AAV 160 may include a cargo handling element 167. As illustrated, cargo handling element 167 may comprise a lift hook or clamp for engaging a cargo carrier, e.g., a basket and the like. However, in another example, cargo handling element 167 may alternatively or additionally comprise an internal cargo compartment in which to receive and transport an item or object. It should be noted that AAV 161 may be similarly equipped. However, for ease of illustration, specific labels for such components of AAV 161 are omitted from FIG. 1.

In addition, each of the AAVs 160 and 161 may include on-board processing systems to perform steps, functions, and/or operations for an autonomous aerial vehicle to define a reserved zone within a space to perform an assigned task, based upon at least one object that is detected, and to present an announcement of the reserved zone, and for controlling various components of the respective AAVs. For instance, AAVs 160 and 161 may each comprise all or a portion of a computing device or processing system, such as computing system 400 as described in connection with FIG. 4 below, specifically configured to perform various steps, functions, and/or operations for an autonomous aerial vehicle to define a reserved zone within a space to perform an assigned task, based upon at least one object that is detected, and to present an announcement of the reserved zone. For instance, an example method 300 for an autonomous aerial vehicle to define a reserved zone within a space to perform an assigned task, based upon at least one object that is detected, and to present an announcement of the reserved zone is illustrated in FIG. 3 and described in greater detail below.

In an illustrative example, the facility 190 may comprise a warehouse or a large box store that may have various aisles, such as aisle 192, with rows of shelves 195 holding various items or products. As further illustrated in FIG. 1, there may be two people 140 within the aisle, one of whom may possess a user device 141. Continuing with the present example, the facility 190 may utilize AAVs to perform various tasks therein, such as retrieving items, placing items on shelves 195, taking inventory, for instance, reading barcodes or QR codes from various items, from boxes containing various items, etc., capturing images of various areas within the facility 190, and so forth. In one example, the assignment of task to AAVs and the management of the airspace of the facility 190 may be provided by a fleet management system, which may comprise server(s) 125 and/or server(s) 112. In this case, the fleet management system may assign to AAV 160 a task of retrieving an item from one of the shelves 195.

At an earlier time, AAV 160 may already have navigated through the facility 190 and captured imagery of the facility 190 from various vantages in order to generate a spatial map of the facility 190. For instance, AAV 160 may have captured LiDAR sensor data to generate images/renderings of the space of the facility 190. In one example, AAV may obtain mapping data (e.g., a spatial map) from the fleet management system (e.g., server(s) 125 and/or server(s) 112). For instance, other AAVs may have similarly captured LiDAR sensor data and/or generated LiDAR images/rendering of the facility 190, respective portions of the facility 190, etc., and provided such data to server(s) 125 and/or server(s) 112 for storage, aggregation, updating, distribution, etc. For example, as different AAVs provide mapping data to server(s) 125 and/or server(s) 112, the new mapping data may conflict with the previously stored mapping data. As such, server(s) 125 and/or server(s) 112 may update the stored mapping data to reflect the more recently captured data.

In any event, AAV 160, upon being assigned the task, may begin navigating toward the area associated with the task, e.g., aisle 192. For instance, the AAV 160 may navigate by using the previously captured and/or obtained map, or mapping data from a current location toward the aisle 192. In one example, AAV 160 may anticipate claiming a space 150 as a reserved zone in which it may need to work on the task. In one example, AAV 160 may obtain information from server(s) 125 and/or server(s) 112 regarding plans of other AAVs (or non-aerial AVs) that may possibly be within the same space (e.g., aisle 192) at the anticipated time for AAV 160 to arrive and engage in the task. Assuming there is no conflict with task assignments or navigation plans of other AAVs or non-aerial AVs, AAV 160 may arrive at the aisle 192. As AAV 160 approaches the area, AAV 160 may continue to scan its surroundings to detect that the current status matches with the map and/or mapping data, or to discover a discrepancy between the map and/or mapping data, and the current sensor readings.

For instance, as illustrated in FIG. 1, the people 140 may be present in the aisle 192. In one example, AAV 160 may detect the people by capturing one or more images via at least one imaging sensor. For example, the at least one imaging sensor may comprise an optical camera of the AAV, a LiDAR unit, or the like. Thus, the at least one image may comprise one or more images captured via the camera, a 3D rendering captured via the LiDAR unit, and so forth. In one example, the at least one image may comprise two or more images captured via at least two different types of imaging sensors (e.g., combining the collection of one or more optical images with one or more LiDAR images/renderings). From within these image(s), AAV 160 may detect the presence of obstructions, items, or objects not contained with the prior map and/or mapping data. In one example, AAV 160 may identify the people 140, e.g., by identifying the people 140 specifically as "people" or each individually as a "person." For instance, AAV 160 may apply one or more detection models (e.g., MLMs) to the captured image(s) for detecting various types of items (e.g., people, service animals, vehicles, shelves, ladders, tables, etc.). However, in another example the AAV may simply identify visual/spatial features that stand out from the surrounding environment that may be considered as new and/or altered spatial data as compared to the prior map and/or mapping data.

Alternatively, or in addition, AAV 160 may detect at least one of the people 140 via the user device 141, e.g., via direct/peer-to-peer wireless communication and/or sensing announcements/broadcasts by user device 141, or in the case where user device 141 may comprise an RFID tag or transponder, via RFID sensing/detection. In a similar manner, AAV 160 may also detect other items, such as moveable fixtures, equipment, etc., or other people via RFID tags/transponders if such people or items are so equipped. For instance, the facility 190 may require that all personnel or visitors carry RFID tags that may be sensed by AAVs operating therein.

In one example, AAV 160 may record any changes to the map and/or mapping data that it detects. In one example, AAV 160 may also notify server(s) 125 and/or server(s) 112 of the change(s) so that server(s) 125 and/or server(s) 112 may update the stored map and/or mapping data with the most recent information. It should be noted that in one example, AAV 160 may omit notification to server(s) 125 and/or server(s) 112 of certain changes that may be detected. For instance, in the case of people 140 being detected, AAV 160 may note their presence in its own mapping data, but may maintain this data as temporary information (e.g., expiring after a certain period of time to protect privacy of the detected people). Similarly, AAV 160 may omit forwarding such data to server(s) 125 and/or server(s) 112, or may forward to server(s) 125 and/or server(s) 112 with an indication that such data is temporary in nature and should be deleted within a predefined time. Alternatively, or in addition, server(s) 125 and/or server(s) 112 may simply receive the notification and determine that the data is temporary in nature since it relates to the presence of people. In contrast, when AAV 160 detects semi-permanent items (e.g., moveable fixtures) such as ladders, seasonal displays, oversized items that do not fit on shelves, etc., AAV 160 may notify server(s) 125 and/or server(s) 112 for recording these changes in the map/mapping data that may be shared among a fleet of a plurality of AAVs.

Returning to the illustration of FIG. 1, AAV 160 may determine that it needs to pick-up an item from the $5^{th}$ level of one of the shelves 195. If the aisle 192 is completely unoccupied, the AAV 160 may be configured to claim a reserved zone of the entire aisle 192. For instance, it may be faster and easier for AAV 160 to navigate and complete the task if it has a wide buffer and does not need to worry about incursions into the reserved zone by people or other AAVs, etc. However, in this case, because people 140 are present, AAV 160 may determine that it cannot claim the entire aisle 192. As described above, AAV 160 may then evaluate how much space it can reserve, given the items or other changes in the space that are detected. For example, AAV 160 may reserve the space 150 which includes the 5th level from which AAV 160 needs to retrieve the item and which extends below while remaining above the head of the tallest one of the people 140 (e.g., with additional space as a buffer zone such as 5, 10 or 15 feet).

In one example, AAV 160 may seek permission from server(s) 125 and/or server(s) 112 to claim the reserved zone (e.g., space 150). In another example, AAV 160 may claim the space 150 and may simply notify server(s) 125 and/or server(s) 112. For instance, the permission may be implied insofar as server(s) 125 and/or server(s) 112 may have dispatched AAV 160 to aisle 192 specifically for the purpose of completing the assigned task. If permission is specifically requested, for illustrative purpose it may be assumed that server(s) 125 and/or server(s) 112 may reply with a positive affirmation.

In any case, AAV 160 may then announce the reservation of space 150 (e.g., as its "reserved zone"). In one example, the facility 190 may include a plurality of fixed reference points 199 which may comprise reflectors, RIFD beacons or tags, or the like from which AAV 160 may determine its position within the facility 190 with respect to a reference coordinate system via RF sensing/triangulation, optical or LiDAR ranging, etc. Using the same reference coordinate system in conjunction with LiDAR ranging and imaging/rendering, the AAV 160 may determine coordinates to define the boundary of the space 150. Accordingly, in one example, AAV 160 may transmit a set of coordinates (e.g., x-y-z coordinates) to the fleet management system (e.g., server(s) 125 and/or server(s) 112) to indicate the space 150 that is being reserved. In one example, AAV 160 may also communicate these coordinates directly to other AAVs or non-aerial AVs nearby (e.g., via direct, peer-to-peer wireless communications, which in one example may include broadcasts announcements that do not necessarily involve establishing a communication session). Alternatively, or in addition, other AAVs, non-aerial AVs, human personnel via mobile computing devices, etc. may obtain notification of the reservation of the space 150 (e.g., the coordinates, the time and/or duration of the reservation, the identify of AAV 160 claiming the space 150, etc.) via communications from server(s) 125 and/or server(s) 112.

In one example, AAV 160 may define the claimed space 150 in human-perceptible terms and announce the claiming/reservation of the space 150. For instance, AAV 160 may audibly announce the claim of space 150 via a loudspeaker that can be heard by any nearby person (e.g., people 140). In one example, the announcement may state information such as "AAV working above you picking up an item from level 5." In one example, AAV 160 may generate a more detailed message that is tailored to the positions of any detected people (e.g., people 140) and the space 150. For instance, the AAV 160 may determine that the people are located directly below the space 150. As such, AAV 160 may announce "AAV working in reserved space, reserved space begins 15 feet from your position starting at a height of 10 feet off the ground." AAV 160 may optionally calculate an estimated time of completion of the task and notify the fleet management system (e.g., server(s) 125 and/or server(s) 112) and nearby people (e.g., people 140) via an audible announcement.

In one example, AAV 160 may alternatively or additionally notify any present humans of the claim to space 150 using an onboard projector or other light source(s) to project an image that demarks the reserved space 150 in which the AAV 160 is performing the task. For instance, the AAV 160 may project visible light to be seen by people 140 (as indicated by the highlighted delineation of the space 150 around the AAV 160 in FIG. 1). Upon completion of the task, AAV 160 may announce the relinquishment of the space 150 via audible announcement and/or by ceasing the visual notification. In one example, AAV 160 may also transmit a notification to server(s) 125 and/or server(s) 112, and/or broadcast via wireless communication to other AAVs and/or non-aerial AVs indicating that the space 150 has been released by AAV 160. Additional operations that may be provided by AAV 160 and/or AAV 160 in conjunction with AAV 161, server(s) 125 and/or server(s) 112, etc. will be described below in connection with the examples of FIG. 2.

In addition, the foregoing illustrates just one example of a system in which examples of the present disclosure for an autonomous aerial vehicle to define a reserved zone within a space to perform an assigned task, based upon at least one object that is detected, and to present an announcement of the reserved zone may operate. It should also be noted that the system 100 has been simplified. In other words, the system 100 may be implemented in a different form than that illustrated in FIG. 1. For example, the system 100 may be expanded to include additional networks, and additional network elements (not shown) such as wireless transceivers and/or base stations, border elements, routers, switches, policy servers, security devices, gateways, a network operations center (NOC), a content distribution network (CDN) and the like, without altering the scope of the present disclosure. In addition, system 100 may be altered to omit various elements, substitute elements for devices that perform the same or similar functions and/or combine elements that are illustrated as separate devices.

As just one example, one or more operations described above with respect to server(s) 125 may alternatively or additionally be performed by server(s) 112, and vice versa. In addition, although server(s) 112 and 125 are illustrated in the example of FIG. 1, in other, further, and different examples, the same or similar functions may be distributed among multiple other devices and/or systems within the telecommunication network 110, wireless access network(s) 115, and/or the system 100 in general that may collectively provide various services in connection with examples of the present disclosure for an autonomous aerial vehicle to define a reserved zone within a space to perform an assigned task, based upon at least one object that is detected, and to present an announcement of the reserved zone. In still another example, severs(s) 112 may reside in telecommunication network 110, e.g., at or near an ingress node coupling wireless access network(s) 115 to telecommunication network 110, in a data center of telecommunication network 110, or distributed at a plurality of data centers of telecommunication network 110, etc. Additionally, devices that are illustrated and/or described as using one form of communication (such as a cellular or non-cellular wireless communications, wired communications, etc.) may alternatively or additionally utilize one or more other forms of communication. For instance, in one example, server(s) 125 may communicate with AAV 160, such as for assigning tasks to AAV 160, monitoring for task completion, etc. via a wireless access point (AP) 122. For instance, server(s) 125 may be owned or operated by the same entity owning or controlling the facility 190, and may have one or more wireless access points, such as AP 122, deployed throughout the facility 190. Thus, communications between server(s) 125 and AAV 160 may not traverse any networks external to the entity. For instance, AP 122 and AAV 160 may establish a session via Wi-Fi Direct, LTE Direct, a 5G D2D sidelink, a DSRC session/pairing, etc. Thus, these and other modifications are all contemplated within the scope of the present disclosure.

FIG. 2 illustrates example scenes of an AAV defining a reserved zone within a space to perform an assigned task, based upon at least one object that is detected, and presenting an announcement of the reserved zone, in accordance with the present disclosure. The examples of FIG. 2 may relate to the same components as illustrated in FIG. 1 and discussed above. For instance, in a first example scene 210, AAV 160 may be retrieving or placing an item on one of the upper levels of shelves 195 in aisle 192. Upon arriving in aisle 192, AAV 160 may utilize on-board sensors (e.g., a LiDAR unit, an optical camera, etc.) to capture one or more images of aisle 192 and to detect any changes to a previously stored and/or obtained map, which may include temporary obstacles, permanent or semi-permanent fixtures, etc., as well as any humans or animals present, other AAVs or non-aerial AVs, etc.

In one example, the people 140 in scene 210 may be detected by collecting sensor data, such as camera images and/or video, LiDAR measurements, etc. and inputting the sensor data to one or more trained detection models (e.g., MLMs) such as described above. The MLMs may be stored and applied by an on-board processing system of AAV 160. In another example, AAV 160 may transmit collected sensor data to server(s) 112 and/or server(s) 125 of FIG. 1, which may apply the sensor data as inputs to one or more detection models, and which may respond to AAV 160 with any detected items or objects. It should be noted that in still another example, one or more detection models may be possessed by AAV 160 and applied locally, while other detection models may remain in the network-based system components (e.g., server(s) 112 and/or server(s) 125) and may be applied in the network.

Thus, in the present case, AAV 160 may detect people 140 via one or more detection models. Accordingly, AAV 160 may claim space 150 as a reserved zone, specifically excluding space within the aisle 192 that is closer to the floor (e.g., within 10 feet of the floor, 15 feet of the floor, etc., depending upon the heights of the people 140, the ceiling height (if any), the height of the shelf level to be accessed, etc.). AAV 160 may also provide a visual projection of the space 150 it is occupying or intends to occupy. In addition, AAV 160 may also present audible warnings to people 140, or others nearby, of the claim to space 150 and to indicate that AAV 160 will be operating therein.

Next, scene 220 may be similar to scene 210, but in this case, the people 140 may not be present in the aisle 192. For instance, AAV 160 may arrive in aisle 192 to engage in the assigned task, may capture one or more images to detect any changes from a prior map, and may detect that the aisle 192 appears to be unchanged. Continuing with the present example, AAV 160 may reserve space 150 which may extend from the floor to the ceiling of aisle 192 and may provide a visual projection of the space 150 that it is occupying (e.g., via one or more projectors or lighting units). When people 140 approach and attempt to enter aisle 192, they may see the visual projection of the space 150 and be informed that AAV 160 has reserved space 150. As in the previous example, AAV 160 may also present audible warnings to people 140, or others nearby, of the claim to space 150 and to indicate that AAV 160 will be operating therein.

The third scene 230 may be similar to the previous scene. However, scene 230 illustrates that AAV 160 may reserve a space and release portions thereof as it competes portions of a task and no longer needs certain portions of the space. For instance, AAV 160 may have claimed/reserved a space of aisle 192 that extends floor to ceiling, but may have finished a portion of the task on the right lower side of the aisle. AAV 160 may then complete an additional portion of the task on the lower left side of the aisle. As such, AAV 160 may next release the portion 152 of the reserved space. AAV 160 may be finishing the task within the portion 150, which it may release last as the final portion of the task is completed. Thus, in one example, people 140 seeking to enter aisle 192 may first utilize at least the right side of the aisle. As AAV 160 completes the next portion of the task, the people 140 may then use the entire lower space of the aisle (e.g., the entire space where a human walking on the ground could conceivable occupy).

In a fourth scene 240, AAV 160 may claim space 150 in aisle 192 between shelves 195. In addition to providing a visual projection of the space 150 that it is occupying (e.g., via one or more projectors or lighting units), AAV 160 may also seek assistance from another AAV 161, or a fleet management system (such as server(s) 125 and/or server(s) 112 of FIG. 1) may instruct AAV 161 to accompany AAV 160 to provide additional notification of the reservation of space 150 to any nearby people, such as people 140. For instance, AAV 160 may be engaging in a task that may be more dangerous, such as lifting a large or bulky item, such that it may be desirable to have additional precautions to keep people away. Thus, for example, AAV 161 may be instructed by AAV 160 and/or by a fleet management system to post itself at the end of aisle 192 and to project visual information such as a warning, e.g., "aisle will be closed for 5 minutes," or the like. For instance, the instruction may be via a communication session in accordance with Wi-Fi Direct, LTE Direct, DSRC, 5G D2D or V2V, etc.). It should be noted that the example of scene 240 is provided for illustrative purposes and that in other examples, AAV 160 may itself project visual information, e.g., as an alternative or in addition to an illumination of the space 150, and/or as an alternative or in addition to an audible announcement.

In a fifth scene 250, AAV 160 may arrive at aisle 192 to perform a task, may capture one or more images to detect any changes from a prior map, and may detect that the aisle 192 appears to include a new object, e.g., a seasonal display 197. For example, AAV 160 may apply the captured image(s) as inputs to one or more detection models to detect objects or items (e.g., shelves, people, vehicles, etc.), or may provide the captured images to a network-based processing system to similarly apply the captured image(s) to one or more detection models. In another example, AAV 160 may not identify the particular type of item or object, but may simply detect a change from the prior map and/or mapping data. In one example, AAV 160 may, at a minimum, identify any people who are present in the aisle 192 and/or animals that are present, while other objects may simply be detected as "non-human" or "non-animate."

Continuing with the present example, AAV 160 may detect the new seasonal display 197 and may reserve space 150, which may comprise an upper portion of aisle 192 near the shelves 195 on the opposite side from the seasonal display 197. As in the previous examples, AAV 160 may provide a visual projection of the space 150 that it is occupying (e.g., via one or more projectors or lighting units) to inform people nearby, such as people 140. For example, people 140 may see from the visual projection of the space 150 that the lower portion of the aisle 192 is open. Thus, the people 140 may proceed to the seasonal display 197 or elsewhere in the aisle 192 without interfering with the reserved space 150. It should be noted that as in all of the previous examples, AAV 160 may also present audible warnings to people 140, or others nearby, of the claim to space 150 and to indicate that AAV 160 will be operating therein. This may be particularly useful when the space 150 may be more challenging to delineate using lighting and/or visual projection. For example, at least one side of the space 150 is not bounded by a surface upon which light may be projected. Thus, the bounds of space 150 in this direction may be less clear via illumination. However, an audible warning of the reservation of space 150 may clarify the bounds.

In a sixth example scene 260, AAV 160 may arrive at aisle 192 to perform a task, may capture one or more images to detect any changes from a prior map, and may detect that the aisle 192 appears to include new objects, specifically people 140. In the present example, AAV 160 may not be permitted to simply occupy the aisle 192 (e.g., when customers such as people 140 are present). Accordingly, AAV 160 may need to wait until the aisle 192 is clear. In one example, AAV 160 may present an audible message for the people 140 indicating that AAV 160 is waiting and intends to occupy aisle 192 when the people 140 are finished. For instance, AAV 160 may present an audible message, such as "please finish your selections," or "please do not enter aisle 192 due to pending AAV operation" for other people who are about to enter aisle 192, and the like. When people 140 leave the aisle 192, AAV 160 may then enter, claim a space, and perform the assigned task within the space that is claimed/reserved.

It should be noted that the foregoing examples are provided for illustrative purposes, and that other, further, and different examples may include more or less features, or may combine features in different ways in accordance with the present disclosure, such as having different combinations of sensor data available, utilizing different modes of audible and/or visible announcement of reserved zones, and so on. As just one additional example, AAV 160 may broadcast messages to listening augmented reality (AR) devices of any people in the vicinity. The broadcast messages may contain coordinates of the bounds of space 150, such that the AR devices may depict the space 150 with a particular visual indication, e.g., highlighting in a transparent or semi-transparent way of the space 150 using a particular color, or colors, flashing lights, displaying boundary lines, etc. Similarly, AAV 160 may broadcast an audible announcement of a reserved space, or "reserved zone," via a wireless broadcast to be detected by user devices and presented via speakers or attached headsets of such user devices. It should also be noted that an audible announcement may be ongoing for the duration of AAV 160 performing a task, such as repeating an audible message every five seconds, every 10 seconds, or the like. Similarly, audible announcements and/or visible announcements of a claimed space may change as the task progresses (e.g., "this aisle will be occupied for the next five minutes," "this aisle will be occupied for the next four minutes," etc. as the task moves closer to completion).

FIG. 3 illustrates a flowchart of an example method 300 for an autonomous aerial vehicle to define a reserved zone within a space to perform an assigned task, based upon at least one object that is detected, and to present an announcement of the reserved zone. In one example, steps, functions and/or operations of the method 300 may be performed by an AAV, such as AAV 160 or any one or more components thereof, or by AAV 160, and/or any one or more components thereof in conjunction with one or more other components of the system 100, such as server(s) 125, server(s) 112, elements of wireless access network 115, telecommunication network 110, one or more other AAVs (such as AAV 161), and so forth. In one example, the steps, functions, or operations of method 300 may be performed by a computing device or processing system, such as computing system 400 and/or hardware processor element 402 as described in connection with FIG. 4 below. For instance, the computing system 400 may represent any one or more components of the system 100 (e.g., AAV 160) that is/are configured to perform the steps, functions and/or operations of the method 300. Similarly, in one example, the steps, functions, or operations of the method 300 may be performed by a processing system comprising one or more computing devices collectively configured to perform various steps, functions, and/or operations of the method 300. For instance, multiple instances of the computing system 400 may collectively function as a processing system. For illustrative purposes, the method 300 is described in greater detail below in connection with an example performed by a processing system. The method 300 begins in step 305 and may proceed to step 310.

At step 310, the processing system (e.g., of an autonomous aerial vehicle (AAV)) obtains mapping data describing at least a portion of a facility. For instance, the mapping data may be obtained from a LiDAR unit of the AAV and may be stored by the processing system. For instance, the AAV may obtain the mapping data by first traversing the facility. In another example, the mapping data may be obtained from a fleet management system, as described above.

At optional step 315, the processing system may obtain an assigned task from a fleet management system. The task may comprise, for example: a delivery of at least one item, a retrieval of at least one item, a mapping task, an imaging task, a sensor reading task, a visual projection task, a lighting projection task, a search task, or a security surveillance task, a combination of any of the foregoing, and so on. The assigned task may be for performance within a facility having a defined bounds, such as a warehouse, a retail store, a refinery, a shipyard, a marine terminal, a lumber yard, a quarry, a construction site, an apartment building, an event venue, such as a stadium, an arena, a theater, etc.

In one example, the assigned task may be retrieving an item from an aisle or placing an item in the aisle (e.g., of a store, a warehouse, etc.). In one example, the assigned task may involve placing one item and retrieving another in the same aisle (e.g., for efficiency purposes). In one example, the aisle may comprise a plurality of shelves, where the assigned task may comprise retrieving at least one item from at least one of the plurality of shelves. In one example, the assigned task may comprise performing an inventory of at least a portion of the aisle.

In still another example, the assigned task may comprise a delivery of at least one item to a person or to another AAV. For instance, in one example, the facility may comprise an event venue, where the delivery may be of food or drink, or can be a worksite where the AAV delivers a tool, a piece of equipment, an item to install, etc., to a worker, or delivers the item halfway to another AV to complete. In still another example, the assigned task may comprise an imaging task, such as performing an aerial survey of equipment and comparing to one or more prior surveys to detect changes, defects, etc. For instance, at a refinery, a port, etc. there may be a task of surveying towers, cranes, ship hulls, etc. for cracks, missing bolts, etc. Similarly, at a skyscraper or a tunnel, there may be a task of surveying for safety rail integrity (via collection of images or other sensor data) which may involve entering confined spaces of a facility that may be used by humans but which is temporarily claimed by the AAV to perform the survey, etc.

At step 320, the processing system navigates, via the mapping data, to a space within the facility to perform the assigned task. For example, the processing system may guide the AAV to the space using the previously captured and/or obtained mapping data to avoid collisions with stationary obstructions, to fly an efficient route from a current location to the space to perform the task, etc.

At step 325, the processing system collects spatial sensor data within the space. The spatial sensor data may comprise LiDAR images/renderings, images captured via an optical camera of the AAV, RFID reader/sensor data, etc.

At step 330, the processing system detects, from the spatial sensor data, at least one object within the space. For instance, the at least one object may comprise a person/human, an animal, equipment, such as a forklift, a picker, a truck, stacked pipes, lumber, etc., a pile of grain, stones, etc., boxes, ladders, moveable stairs, a store display, and so on. The at least one object may be an object that is not previously contained in the mapping data of the space of the facility. In one example, the processing system may specifically identify items or objects as being of a particular type of category (e.g., people, animal, vehicles, shelves, ladders, tables, etc.). For instance, the processing system may apply one or more detection models (e.g., MLMs) to the captured image(s) for detecting various types of items. However, in another example the AAV may simply identify visual/spatial features that stand out from the surrounding environment and may be considered as new and/or altered spatial data as compared to the prior map and/or mapping data. In one example, the processing system may, at a minimum, identify any people who are present and/or animals that are present, while other objects may simply be noted as "non-human" or "non-animate." In one example, the at least one object may be detected from optical images and/or LiDAR images/renderings. In one example, equipment, personnel, or other humans present at the facility (such as a refinery, a lumberyard, a shipyard, etc.) may be RFID tagged and may be detectable by the processing system via an RFID reader of the AAV.

In one example, step 330 may include detecting one or more fixed reference points which may comprise reflectors, RIFD beacons or tags, or the like from which the processing system may determine the position of the AAV within the facility with respect to a reference coordinate system. This may include RF sensing/triangulation, optical or LiDAR ranging, etc. Using the same reference coordinate system in conjunction with LiDAR ranging and imaging/rendering, the processing system may determine coordinates to define the boundary of the at least one object within the space.

At step 335, the processing system defines a reserved zone within the space to perform the assigned task, based upon the at least one object that is detected. For example, the processing system may claim as much of the space as is available, up to a maximum limit, while accounting for the presence of the at least one object that is occupying at least a portion of a desired space. For instance, the processing system may be configured to attempt to claim a reserved zone with a maximum radius, maximum length, width, height, etc. (e.g., up to 10 meter radius, a space with a volume of 100 cubic meters, etc.). The processing system may then reduce the size of the reserved zone to account for the size of a room being less than these dimensions, an aisle being less than these dimensions, etc., while at the same time also excluding a claim to the space occupied by the at least one object. In an illustrative example, the at least one object may comprise a person such that the processing system may not claim the space occupied by the person (e.g., including a buffer of at least several feet or meters above the person to maintain a safe margin). Thus, the defining of the reserved zone based upon the at least one object that is detected may result in the reserved zone accommodating/excluding the at least one object that is detected (e.g., it provides space to a detected human, it does not claim space that is already occupied by a movable fixtures, a vehicle, such as a forklift, picker, etc., another AAV or non-aerial AV, equipment such as a tent or tarp (which could be covering a stack of piping, beams, lumber, etc. stored at a facility), and so on).

At optional step 340, the processing system may notify the fleet management system of a reservation of the reserved zone. For instance, the processing system may define the bounds of the reserved zone, or space, using the same reference coordinate system mentioned above in conjunction with LiDAR ranging and imaging/rendering. For example, the processing system may determine coordinates (e.g., x-y-z coordinates) to define the boundary of the reserved zone, and transmit the set coordinates to a fleet management system to indicate the reserved zone that is being claimed/reserved. In one example, the processing system may also communicate these coordinates directly to other AAVs or non-aerial AVs nearby (e.g., via direct, peer-to-peer wireless communications, such as Wi-Fi Direct, LTE Direct, a 5G D2D sidelink, a DSRC session/pairing, etc.). In one example, the processing system may transmit one or more broadcasts announcements that do not necessarily involve establishing a communication session.

At optional step 345, the processing system may request a reservation of the reserved zone from a fleet management system. For instance, optional step 345 may be similar to optional step 340. However, when step 345 is performed, the processing system may not cause the AAV to occupy the space/reserved zone unless an affirmation is provided by the fleet management system.

At optional step 350, the processing system may obtain the reservation of the reserved zone (e.g., receiving an affirmation of the request), when the fleet management system determines that the reservation does not conflict with a prior reservation of another entity. The other entity can be another AV or a human personnel of the facility, for example. It should be noted that in an example in which optional steps 345 and 350 are included, optional step 340 may be excluded, and vice versa.

At step 355, the processing system presents at least one of an audible announcement or a visual announcement of the reserved zone. For instance, examples of audible and/or visual announcements are discussed above in connection with the illustrations of FIGS. 1 and 2. For instance, the visual announcement may comprise a projection via at least one lighting unit or at least one projector of visible light indicating a boundary of the reserved zone. The visual announcement may alternatively include an audible announcement. Alternatively, the AAV may simply provide the audible announcement without any visual announcement, e.g., in scenarios where the visual announcement may be ineffective or impractical, e.g., in situations where the reserved zone is already very bright or the reserved zone has mirrors that may reflect the visual announcement to other areas of the facility unintentionally.

At optional step 360, the processing system may detect at least one discrepancy between the spatial sensor data that is collected and the mapping data. The discrepancy may comprise the at least one object that is detected at step 330. For example, the at least one object may comprise a moveable fixture, such as a seasonal display, scaffolding, a food cart, a tent, an equipment trailer, and so on. Alternatively, or in addition, the at least one discrepancy may comprise a detection of a wall where there was none previously, fixed shelving in a different position or different configuration than in the previous mapping data, and so on.

At optional step 365, the processing system may update the mapping data in accordance with the spatial sensor data. For instance, the processing system may update a map stored locally on-board the AAV, or may transmit a notification to a fleet management system to update a shared map, or mapping data.

At optional step 370, the processing system may perform at least a part of the assigned task, such as retrieving an item from an aisle or placing an item in an aisle, e.g., retrieving an item from a shelf or placing the item on a shelf, performing an inventory of at least a portion of the aisle, delivering an item to a person or to another AAV, assisting another AAV, etc.

At optional step 375, the processing system may relinquish at least a first portion of the reserved space as at least a part of the assigned task is completed. In one example, the relinquishing may include generating a new audible announcement and/or altering the visual announcement to conform to a second portion of the reserved space that remains under reservation after the relinquishing of the at least the first portion.

At optional step 380, the processing system may determine whether to continue. For example, if there are additional parts of the task to be completed, the processing system may return to optional step 340, step 355, or optional step 370, e.g., depending upon the particular configuration of the processing system, whether the fleet management system requires AAVs to update reserved zones, whether there are currently any people detected near the reserved zone, etc. Otherwise, the processing system may proceed to step 395.

Following step 355, or one of optional steps 360-380, the method 300 may proceed to step 395. At step 395, the method 300 ends.

It should be noted that the method 300 may be expanded to include additional steps, or may be modified to replace steps with different steps, to combine steps, to omit steps, to perform steps in a different order, and so forth. For instance, in one example, the processing system may repeat one or more steps of the method 300 for additional tasks. In one example, optional steps 360 and 365 may precede step 335. In another example, the method 300 may include summoning another AAV or non-aerial AV to provide additional notification of the occupancy of the reserved zone. Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 4 depicts a high-level block diagram of a computing system 400 (e.g., a computing device or processing system) specifically programmed to perform the functions described herein. For example, any one or more components, devices, and/or systems illustrated in FIG. 1 or described in connection with FIG. 2 or 3, may be implemented as the computing system 400. As depicted in FIG. 4, the computing system 400 comprises a hardware processor element 402 (e.g., comprising one or more hardware processors, which may include one or more microprocessor(s), one or more central processing units (CPUs), and/or the like, where the hardware processor element 402 may also represent one example of a "processing system" as referred to herein), a memory 404, (e.g., random access memory (RAM), read only memory (ROM), a disk drive, an optical drive, a magnetic drive, and/or a Universal Serial Bus (USB) drive), a module 405 for an autonomous aerial vehicle to define a reserved zone within a space to perform an assigned task, based upon at least one object that is detected, and to present an announcement of the reserved zone, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 402 is shown, the computing system 400 may employ a plurality of hardware processor elements. Furthermore, although only one computing device is shown in FIG. 4, if the method(s) as discussed above is implemented in a distributed or parallel manner for a particular illustrative example, e.g., the steps of the above method(s) or the entire method(s) are implemented across multiple or parallel computing devices, then the computing system 400 of FIG. 4 may represent each of those multiple or parallel computing devices. Furthermore, one or more hardware processor elements (e.g., hardware processor element 402) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 402 can also be configured or programmed to cause other devices to perform one or more operations as discussed above. In other words, the hardware processor element 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the present module 405 for an autonomous aerial vehicle to define a reserved zone within a space to perform an assigned task, based upon at least one object that is detected, and to present an announcement of the reserved zone (e.g., a software program comprising computer-executable instructions) can be loaded into memory 404 and executed by hardware processor element 402 to implement the steps, functions or operations as discussed above in connection with the example method(s). Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 402) executing the computer-readable instructions relating to the above described method(s) can be perceived as a programmed processor or a specialized processor. As such, the present module 405 for an autonomous aerial vehicle to define a reserved zone within a space to perform an assigned task, based upon at least one object that is detected, and to present an announcement of the reserved zone (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:
obtaining, by a processing system of an autonomous aerial vehicle, mapping data describing at least a portion of a facility;
navigating, by the processing system via the mapping data, to a space within the facility to perform an assigned task;
collecting, by the processing system, spatial sensor data within the space;
detecting, by the processing system from the spatial sensor data, at least one object within the space;
defining, by the processing system, a reserved zone within the space to perform the assigned task, based upon the at least one object that is detected; and
presenting, by the processing system, an audible announcement and a visual announcement of the reserved zone, wherein the visual announcement comprises a projection via at least one lighting unit or at least one projector of visible light indicating a boundary of the reserved zone.

2. The method of claim 1, wherein the spatial sensor data is obtained via at least one of:
a camera of the autonomous aerial vehicle;
a light detection and ranging unit of the autonomous aerial vehicle; or
a radio frequency identification reader of the autonomous aerial vehicle.

3. The method of claim 1, further comprising:
obtaining the assigned task from a fleet management system.

4. The method of claim 3, further comprising:
notifying the fleet management system of a reservation of the reserved zone.

5. The method of claim 4, wherein the reservation includes a duration for the reservation.

6. The method of claim 1, further comprising:
requesting a reservation of the reserved zone from a fleet management system; and
obtaining an affirmation of the reservation of the reserved zone, when the fleet management system determines that the reservation does not conflict with a prior reservation of another entity.

7. The method of claim 1, wherein the facility comprises:
a store;
a warehouse; or
an event venue.

8. The method of claim 1, wherein the facility has defined boundaries.

9. The method of claim 1, wherein the space comprises an aisle of the facility, wherein the reserved zone comprises at least a portion of the aisle.

10. The method of claim 9, wherein the assigned task comprises at least one of:
retrieving an item from the aisle; or
placing an item in the aisle.

11. The method of claim 9, wherein the aisle comprises a plurality of shelves, wherein the assigned task comprises retrieving at least one item from at least one of the plurality of shelves.

12. The method of claim 9, wherein the assigned task comprises:
performing an inventory of at least the portion of the aisle.

13. The method of claim 1, wherein the assigned task comprises:
a delivery of at least one item to a person or to another autonomous vehicle; or
an imaging task.

14. The method of claim 1, wherein the mapping data is obtained from a light detection and ranging unit of the autonomous aerial vehicle and is stored by the processing system.

15. The method of claim 1, wherein the mapping data is obtained from a fleet management system.

16. The method of claim 1, further comprising:
detecting at least one discrepancy between the spatial sensor data that is collected and the mapping data; and
updating the mapping data in accordance with the spatial sensor data.

17. The method of claim 1, further comprising:
relinquishing at least a first portion of the reserved zone as at least a part of the assigned task is completed, wherein the relinquishing comprises generating a new audible announcement or altering the visual announcement to conform to a second portion of the reserved zone that remains after the relinquishing of the at least the first portion.

18. A non-transitory computer-readable medium storing instructions which, when executed by a processing system of an autonomous aerial vehicle including at least one processor, cause the processing system to perform operations, the operations comprising:
obtaining mapping data describing at least a portion of a facility;
navigating, via the mapping data, to a space within the facility to perform an assigned task;
collecting spatial sensor data within the space;
detecting, from the spatial sensor data, at least one object within the space;
defining a reserved zone within the space to perform the assigned task, based upon the at least one object that is detected; and
presenting an audible announcement and a visual announcement of the reserved zone, wherein the visual announcement comprises a projection via at least one lighting unit or at least one projector of visible light indicating a boundary of the reserved zone.

19. An apparatus comprising:
a processing system including at least one processor of an autonomous aerial vehicle; and
a computer-readable medium storing instructions which, when executed by the processing system, cause the processing system to perform operations, the operations comprising:
obtaining mapping data describing at least a portion of a facility;
navigating, via the mapping data, to a space within the facility to perform an assigned task;
collecting spatial sensor data within the space;
detecting, from the spatial sensor data, at least one object within the space;

defining a reserved zone within the space to perform the assigned task, based upon the at least one object that is detected; and presenting an audible announcement and a visual announcement of the reserved zone, wherein the visual announcement comprises a projection via at least one lighting unit or at least one projector of visible light indicating a boundary of the reserved zone.

20. The apparatus of claim 19, wherein the spatial sensor data is obtained via at least one of:

a camera of the autonomous aerial vehicle;

a light detection and ranging unit of the autonomous aerial vehicle; or a radio frequency identification reader of the autonomous aerial vehicle.

* * * * *